United States Patent
Varrato

(10) Patent No.: US 12,399,565 B2
(45) Date of Patent: Aug. 26, 2025

(54) TIMING OF HAPTIC SIGNALS

(71) Applicant: Cirque Corporation, Sandy, UT (US)

(72) Inventor: Steven Varrato, South Jordan, UT (US)

(73) Assignee: Cirque Corporation, Sandy, UT (US)

( * ) Notice: Subject to any disclaimer, the term of this patent is extended or adjusted under 35 U.S.C. 154(b) by 413 days.

(21) Appl. No.: 17/937,883

(22) Filed: Oct. 4, 2022

(65) Prior Publication Data

US 2024/0111365 A1    Apr. 4, 2024

(51) Int. Cl.
*G06F 3/01* (2006.01)
*G06F 3/0354* (2013.01)
*G06F 3/044* (2006.01)

(52) U.S. Cl.
CPC .......... *G06F 3/016* (2013.01); *G06F 3/03547* (2013.01); *G06F 3/0446* (2019.05)

(58) Field of Classification Search
None
See application file for complete search history.

(56) References Cited

U.S. PATENT DOCUMENTS

| | | | |
|---|---|---|---|
| 8,633,916 B2 | 1/2014 | Bernstein | |
| 11,030,865 B1 | 6/2021 | Di Luca | |
| 11,043,088 B2 * | 6/2021 | Hill | H04M 19/04 |
| 11,209,931 B2 | 12/2021 | Lynn | |
| 2019/0187792 A1 * | 6/2019 | Basehore | G06F 3/017 |
| 2021/0240268 A1 * | 8/2021 | Knoppert | G06F 3/03547 |
| 2022/0198173 A1 * | 6/2022 | Azumi | G06F 3/0412 |
| 2022/0350463 A1 * | 11/2022 | Walkin | G06F 1/1662 |
| | | | 345/174 |

* cited by examiner

*Primary Examiner* — Duane N Taylor, Jr.

(57) ABSTRACT

Delivering a haptic feedback using a capacitance module may include obtaining a location of user input using a capacitive sensor in the capacitance module, determining when to activate a first haptic motor in the capacitance module based on the location of the user input, determining when the activate a second haptic motor in the capacitance module based on the location of the user input, generating a first haptic signal with the first haptic motor at the first determined time, and generating a second haptic signal with the second haptic motor at the second determined time, where the haptic feedback includes the first haptic signal and the second haptic signal.

18 Claims, 18 Drawing Sheets

TIMING OF HAPTIC SIGNALS

FIELD OF THE DISCLOSURE

This disclosure relates generally to systems and methods for capacitance modules. In particular, this disclosure relates to systems and methods for generating haptic feedback using a plurality of haptic motors in a capacitance module.

BACKGROUND

Some devices include a haptic motor located underneath the touchable surface to deliver a haptic feedback that simulates a click. To deliver the haptic feedback, the haptic motor vibrates for a short duration of time. The haptic motor must vibrate with enough strength so that the vibration is felt by the user. Some devices include more than one haptic motor. By including more than one haptic motor, a more localized haptic feedback can be delivered. Multiple haptic motors consume more power than devices with a single haptic motor. In some applications, the problem of increasing power consumption may be proportional to the number of haptic motors used.

Some methods exist to maximize the efficiency of feedback devices that include haptic motors. Some methods include placing passive elements within a device to maximize vibrations at certain locations. When these passive elements receive a weak vibrational feedback from a haptic motor within the device, they create a stronger vibration that may be easier to be perceived by a user.

An example using a haptic motor to deliver feedback is disclosed in U.S. Pat. No. 8,633,916 issued to Jeffrey Traer Bernstein, et al. This example discloses a touch pad with force sensors and actuator feedback. Electronic devices may use touch pads that have touch sensor arrays, force sensors, and actuators for providing tactile feedback. A touch pad may be mounted in a computer housing. The touch pad may have a rectangular planar touch pad member that has a glass layer covered with ink and contains a capacitive touch sensor array. Force sensors may be used to measure how much force is applied to the surface of the planar touch pad member by a user. Processed force sensor signals may indicate the presence of button activity such as press and release events. In response to detected button activity or other activity in the device, actuator drive signals may be generated for controlling the actuator. The user may supply settings to adjust signal processing and tactile feedback parameters.

An example of using haptic feedback is disclosed in U.S. Pat. No. 11,209,931 issued to Lapoe E. Lynn, et al. This example discloses a haptic feedback system. The system includes a plurality of remate transmitters that are remote from a location of interest on a surface of the system. The system includes a signal generator that generates a signal for each of the remote transmitters. The remote transmitters propagate the signals through a medium of the surface and the signals interfere at the location of interest such that a localized disturbance is generated at the location of interest.

Yet another example of using haptic motors is disclosed in U.S. Pat. No. 11,030,865 issued to Massimiliano Di Luca, et al. This example discloses a haptic device including an active element and a plurality of passive elements coupled to the active element. Each passive element has a respective response to a wave transmitted by the active element, and is configured to cause a respective haptic effect at a respective location away from the active element. In some embodiments, the respective response includes resonating when energy having a resonant frequency is received. In some embodiments, the wave transmitted by the active element is in the form of a vibration or acoustic energy.

Each of these references are herein incorporated by reference for all that they disclose.

SUMMARY

In one embodiment, a capacitance module may include a capacitive sensor, a first haptic motor, a second haptic motor; wherein the first haptic motor and the second haptic motor are in mechanical communication with the capacitive sensor, and controlling resources connected to the capacitive sensor and the plurality of haptic motors with memory; wherein the memory contains programmed instructions that cause the controlling resources, when activated, to: determine when to active the first haptic motor in response to a user input, independently determine when to activate the second haptic motor in response to the user input, generate a first haptic signal with the first haptic motor at a first determined time, and generate a second haptic signal with the second haptic motor at a second determined time.

The programmed instructions may cause the controlling resources, when activated, to: determine the amplitude, wavelength, frequency, and phase of the first haptic signal, and determine the amplitude, wavelength, frequency, and phase of the second haptic signal based, in part, on the amplitude, wavelength, frequency, and phase of the first haptic signal.

The first haptic signal and the second haptic signal may generate a haptic feedback that is just tangible at and/or near the location of user input.

The first haptic signal and second haptic signal may be timed to arrive at the location of user input at the same time.

The first haptic signal and second haptic signal may constructively interfere at the location of user input.

Determining when to activate the first haptic motor may include determining a distance between the user input and the first haptic motor and determining when to activate the second haptic motor may include determining a distance between the user input and the second haptic motor.

The capacitive sensor may include at least one pre-defined region, wherein the first determined time and second determined time are pre-programmed based on the pre-defined region corresponding to the location of user input.

The first determined time and the second determined time may have the same value.

The capacitance module may be a touchpad.

The first haptic signal and the second haptic signal may be tuned to minimize vibrations perceptible outside of the capacitance module.

In another embodiment, a method for delivering a haptic feedback with a capacitance module may include obtaining a location of user input using a capacitive sensor in the capacitance module, determining when to activate a first haptic motor in the capacitance module based on the location of the user input, independently determining when to activate a second haptic motor in the capacitance module based on the location of the user input, generating a first haptic signal with the first haptic motor at the first determined time, and generating a second haptic signal with the second haptic motor at the second determined time, wherein the haptic feedback comprises the first haptic signal and second haptic signal.

The method may include determining the amplitude, wavelength frequency, and phase of the first haptic signal, and determining the amplitude, wavelength, frequency, and phase of the second haptic signal based on the amplitude, wavelength, frequency, and phase of the first haptic signal.

The first haptic signal and second haptic signal may generate a haptic feedback the is just perceptible at and/or near the location of user input.

The first haptic signal and second haptic signal may be timed to arrive at the location of user input at the same time.

The first haptic signal and second haptic signal may constructively interfere at the location of user input.

Determining when to activate the first haptic motor may include determining a distance between the user input and the first haptic motor, and determining when to activate the second haptic motor may include determining a distance between the user input and the second haptic motor.

The capacitive sensor may include at least one pre-defined region, and the first determined time and second determined time may be pre-programmed based, in part, on the pre-defined region corresponding to the location of user input.

The capacitance module may be a touchpad.

In another embodiment, a computer-program product for generating a haptic feedback using a capacitance module, may include a non-transitory, computer readable medium storing instructions executable by a processor to: obtain a location of user input using a capacitive sensor in the capacitance module, determine when to activate a first haptic motor in the capacitance module based on the location of the user input, independently determine when to activate a second haptic motor in the capacitance module based on the location of the user input, generate a first haptic signal with the first haptic motor at the first determined time, and generate a second haptic signal with the second haptic motor at the second determined time, wherein the haptic feedback comprises the first haptic signal and second haptic signal.

The medium may store further instructions executable by a processor to: determine the amplitude, wavelength, frequency, and phase of the first haptic signal, and determine the amplitude, wavelength, frequency, and phase of the second haptic signal based on the amplitude, wavelength, frequency, and phase of the first haptic signal.

Figure 1:
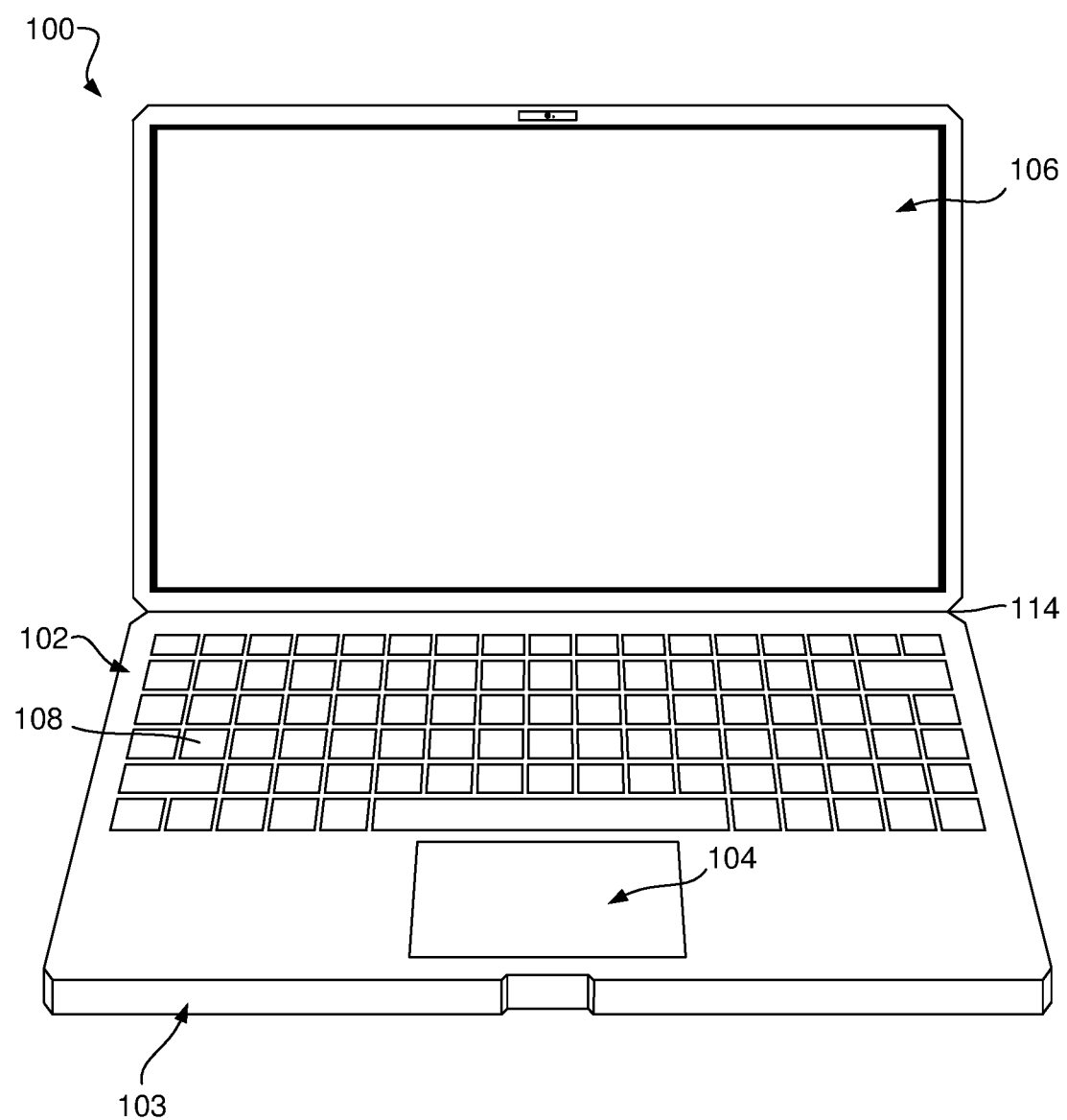
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "haptic signal" may be generally understood as a vibration generated by a haptic motor. The vibration of a haptic motor may be modelled as a vertical displacement with respect to time. In some cases, the haptic signal may be understood as a propagating wave, which may be an accurate model over small intervals of time, typically intervals of microseconds. The vibration of a haptic motor may also be modelled as vertical displacement with respect to horizontal distance. In some cases, the haptic signal may be understood as a standing wave, which may be more accurate over larger intervals of time, typically intervals of milliseconds.

For the purposes of this disclosure, the term "haptic feedback" may be generally understood as a vibration that is meant to be perceived by the user. A haptic feedback may be created by the combination of two or more haptic signals which are small enough in amplitude to be imperceptible on their own. In some cases, one or more of the combined signals may be perceptible on its own. In other examples, haptic feedback can be created by a single haptic signal that is perceptible on its own.

For purposes of this disclosure, a haptic motor may be generally understood as any appropriate device that generates a haptic signal. A non-exhaustive list of types of haptic motors includes, but is not limited to, piezoelectric devices, magnetostrictive devices, vibrators, eccentric rotating masses, linear resonant actuators, another type of actuator, another type of device, or combinations thereof.

In some cases, when haptic motors are included in a capacitance module, as a touchpad in a laptop, haptic feedback may be used to simulate the sensation of depressing the touchpad. While very little physical depression of the capacitance module may take place, the haptic feedback may provide feedback to the user that their input on the touchpad was registered as a click.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
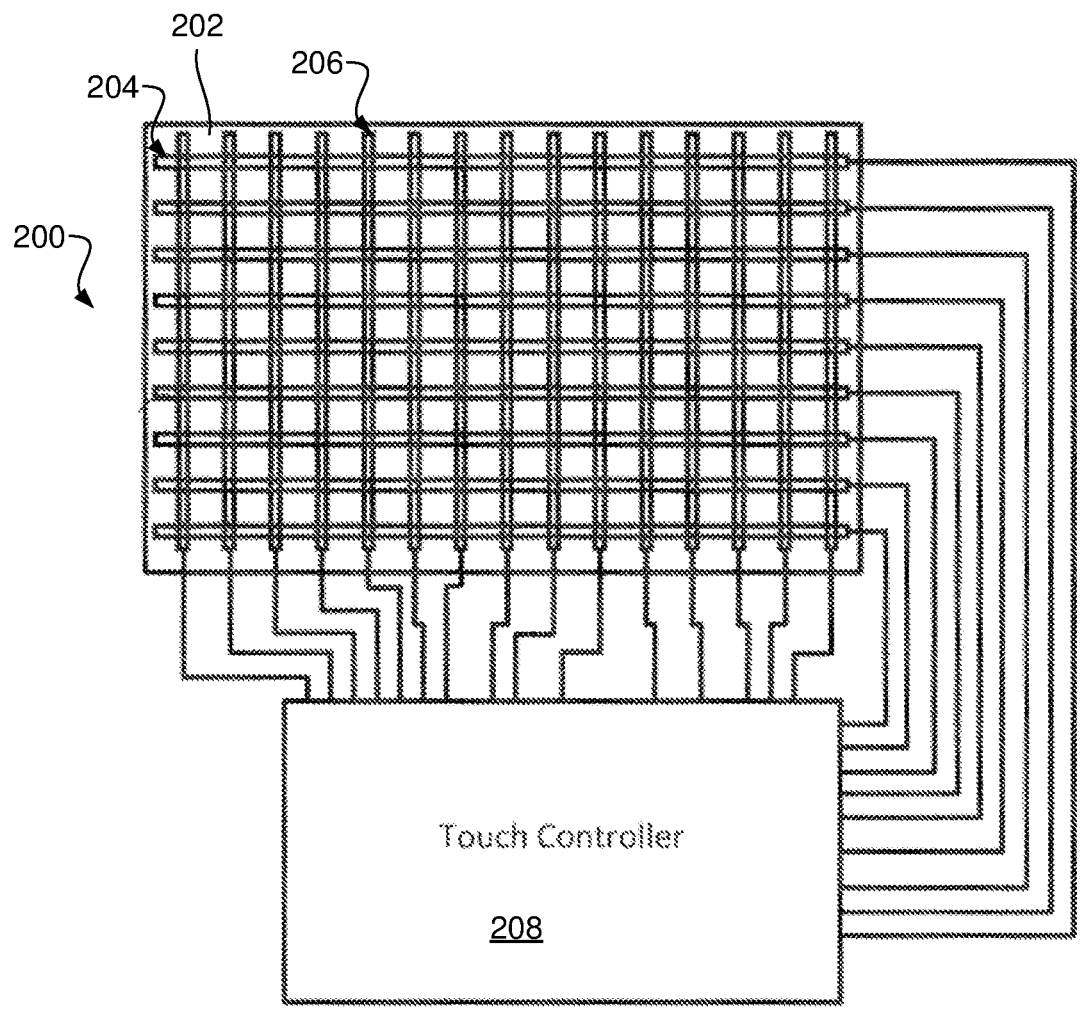
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
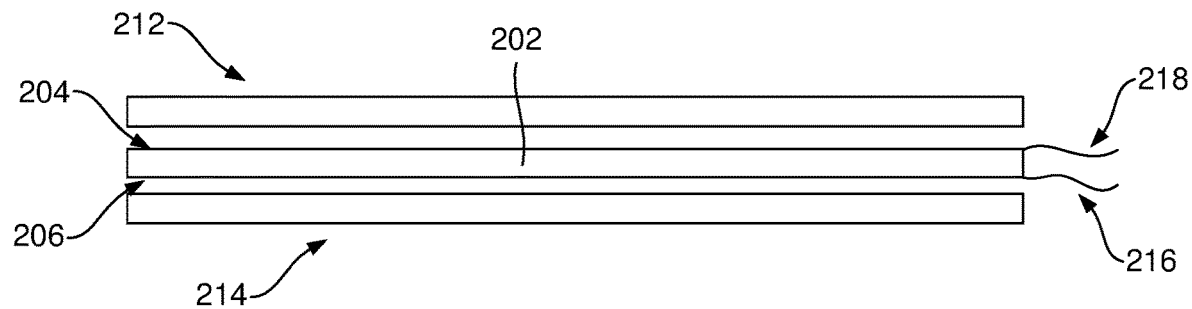
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
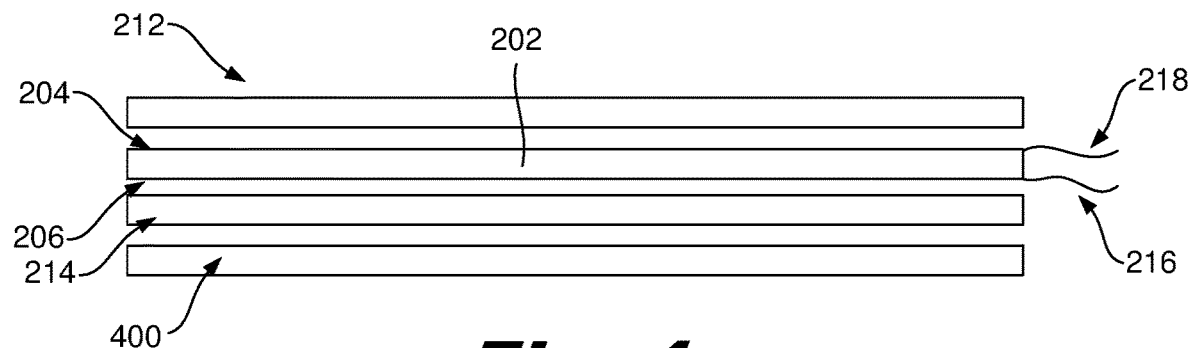
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
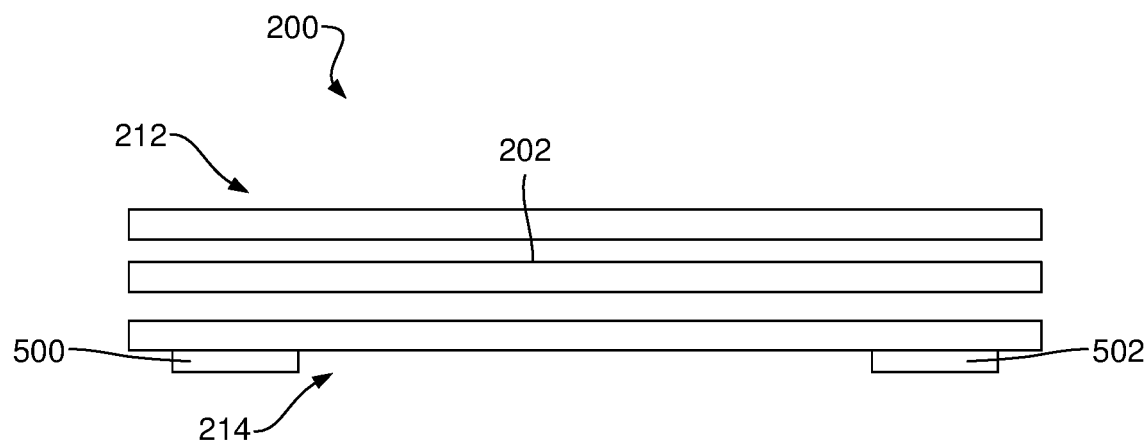
FIG. 5 depicts an example of an input surface in accordance with the disclosure.

FIG. 5 depicts an example of a cross section of a capacitance module 200 where the substrate 202 may be located between a capacitance reference surface 212 and a shield 214. In this example, a first pressure sensor 500 and a second pressure sensor 502 are incorporated into the capacitance module pad 200. As depicted in this example, the pressure sensors 500, 502 may be disposed adjacent to an underside of the substrate 202. But, in other examples, the pressure sensors may be positioned at any appropriate location, including, but not limited to, adjacent the underside of the capacitance reference surface 212, adjacent the underside of the shield, another location, or combinations thereof. In examples where the pressure sensors 500, 502 are positioned under the substrate 202, pressure applied to the capacitance reference surface 212 may be transmitted through the capacitance reference surface 212 exerting a pressure on the substrate 202, which in turn applies a pressure to at least one of the pressure sensors 500, 502. In examples where the pressure sensors are positioned adjacent to the shield, the pressure applied to input surface may be transmitted to the shield, which in turn applies the pressure to the pressure sensors. This pressure may be measured by the pressure sensors 500, 502 to determine the value of the pressure. In this example, the first pressure sensor 500 is spaced apart from the second pressure sensor 502 at a distance along a length, width, and/or another dimension of the capacitance reference surface 212, which may allow the first pressure sensor 500 and the second pressure 502 to detect different levels of pressure depending on the location where the pressure input is made on the capacitance reference surface 212. In some cases, those pressure sensors that are closer to the location where the pressure input is made can detect a greater pressure force than the pressure sensor that is located farther away. The differing pressure values may help determine where the pressure input is made.

While this example is depicted with a pressure sensor incorporated into a capacitance module with a capacitance sensor, in other examples, the pressure sensors are not incorporated with a capacitance sensor. Further, any appropriate type of pressure sensor may be used in accordance with the principles described herein. For example, a non-exhaustive list of suitable pressure sensors includes, but is not limited to, piezoelectric sensors, magnostrictive sensors, potentiometric pressure sensors, inductive pressure sensors, capacitive pressure sensors, strain gauge pressure sensors, variable reluctance pressure sensors, other types of pressure sensors, or combinations thereof.

In some examples, the pressure sensor may also include an ability to provide haptic feedback. For example, a piezoelectric device may be used as both a pressure sensor and as a haptic device. When the piezoelectric material is compressed due to the application of pressure through the capacitance reference surface, the piezoelectric material may produce an electric signal with can be detected by a controller. In some cases, the controller may produce an electric signal that is sent to the piezoelectric material to cause the piezoelectric material to expand, contract, and/or vibrate. The vibrations from the piezoelectric material may cause the capacitance reference surface to vibrate. This vibration may communicate a haptic signal to the user. However, in some examples, the pressure sensors are not configured to provide a haptic signal.

Figure 6:
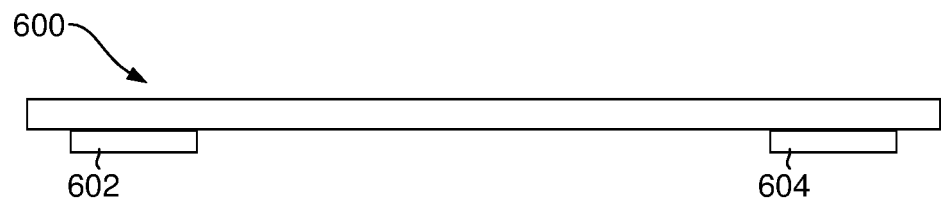
FIG. 6 depicts an example of an input surface in accordance with the disclosure.

FIG. 6 depicts an example of a reference surface 600. In this example, a first pressure sensor 602 and a second pressure sensor 604 are located adjacent to the reference surface 600. In this example, the first pressure sensor 602 and the second pressure sensor 604 are not incorporated into a stack having a capacitance sensor.

Figure 7:
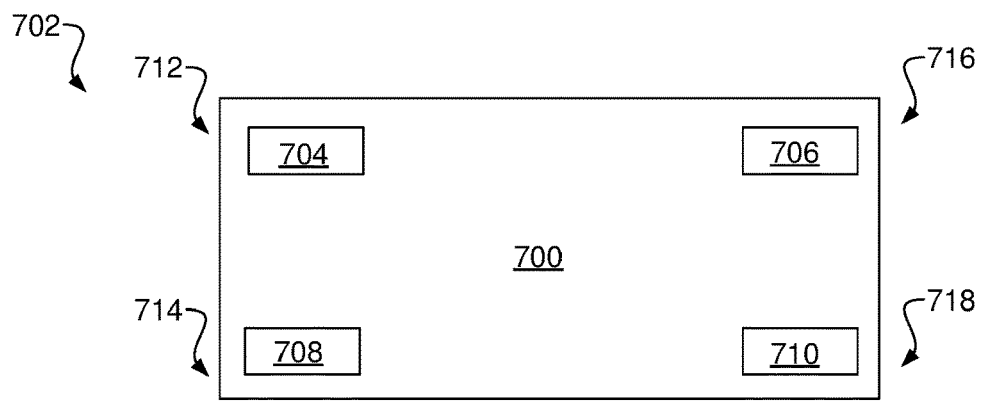
FIG. 7 depicts an example of an arrangement of pressure sensors in accordance with the disclosure.
Figure 8:
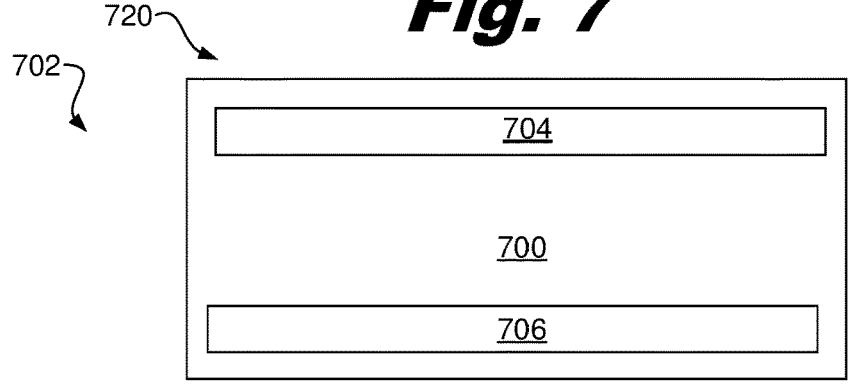
FIG. 8 depicts an example of an arrangement of pressure sensors in accordance with the disclosure.
Figure 9:
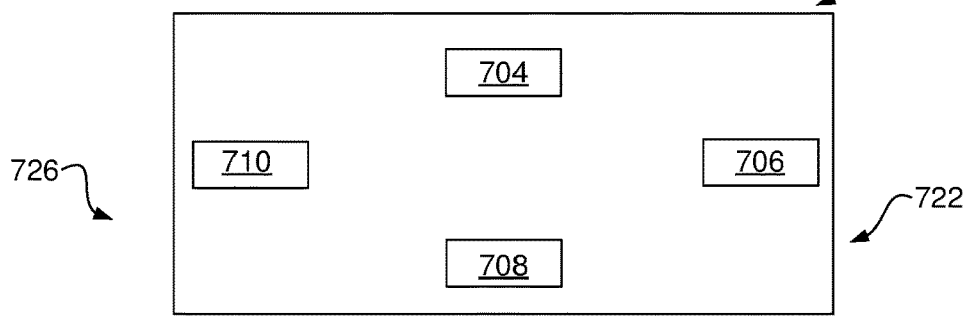
FIG. 9 depicts an example of an arrangement of pressure sensors in accordance with the disclosure.
Figure 10:
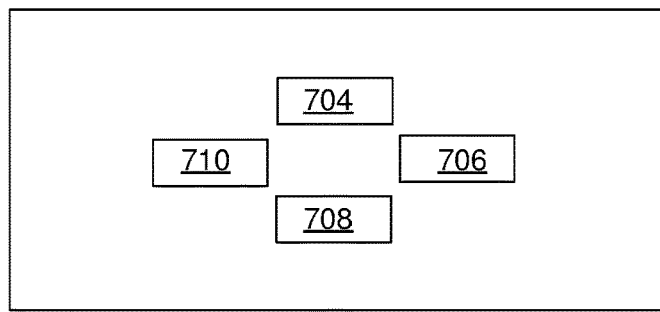
FIG. 10 depicts an example of an arrangement of pressure sensors in accordance with the disclosure.

FIGS. 7-10 depict examples of pressure sensors depicted on an underside 700 of a reference surface 702. In the example of FIG. 7, the reference surface 702 has a rectangular shape and pressure sensors 704, 706, 708, 710 are positioned in each of the corners 712, 714, 716, 718. In the example of FIG. 8, just a first pressure sensor 704 is depicted on a first side 720, and a second pressure sensor 706 is depicted on a second side 722 of the input surface 702. In the example of FIG. 9, the pressure sensors 704, 706, 708, 710 are depicted in the center of the first side 720, the second side 722, the third side 724, and the fourth side 726. In the examples of FIG. 10, the pressure sensors 704, 706, 708, 710 are depicted towards the center of the input surface and away from the edges and corners of the input surface 702.

While the examples in FIGS. 7-10 are described with reference to a specific number of pressure sensors, any appropriate number of pressure sensors may be disposed adjacent to the input surface. For example, the number of pressure sensors may include one pressure sensor or multiple pressure sensors. While the examples depicted above are described with reference to specific patterns and locations for the pressure sensors, other arrangements are contemplated including, but not limited to, symmetric distribution of sensors, an asymmetric distribution of sensors, other distributions and patterns of sensors, or combinations thereof.

Figure 11:
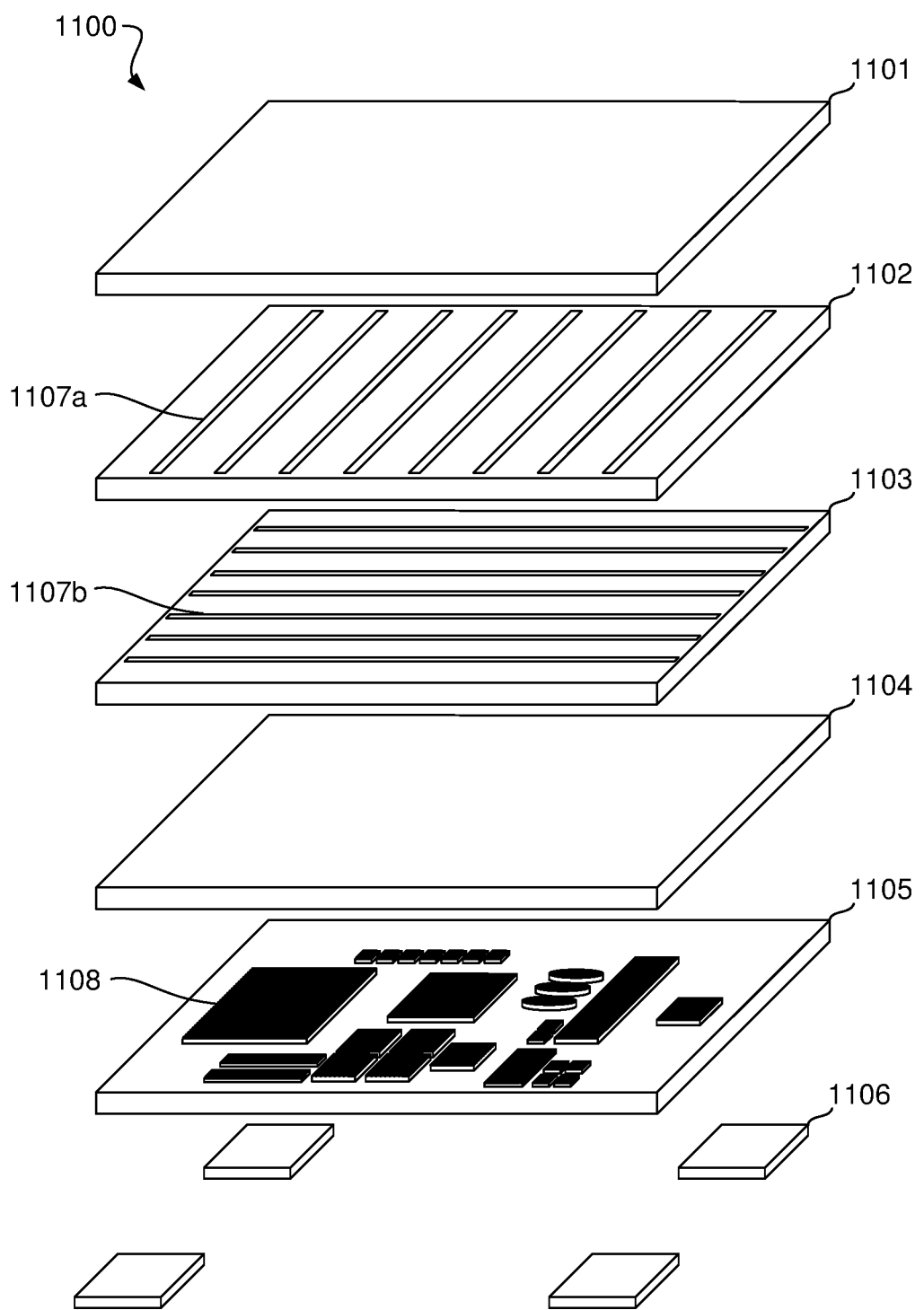
FIG. 11 depicts an example of a capacitance module in accordance with the disclosure.

FIG. 11 depicts an example of a capacitance module 1100 in accordance with the disclosure. In this example, the capacitance module 1100 includes a capacitance reference surface 1101, a first electrode layer 1102, a second electrode layer 1103, a shield layer 1104, a component layer 1105, and haptic motors 1106. While six elements of the capacitance module 1100 are identified in this example, in other examples, a capacitance module may include more or fewer elements. For example, in some examples, the capacitance module does not include a capacitance reference surface. Also, as an example, the electrodes may be combined onto one layer (either the electrodes are position on different sides of the layer or in some cases, the electrodes may be positioned on the same side of the same layer).

It should also be noted that while the elements in the capacitance module 1100 are arranged relative to other elements in the capacitance module, in other examples, the relative arrangement of elements may differ. For example, while the haptic motors 1106 are located adjacent to the component layer 1105 in this example, in another example, haptic motors may be located in between a first electrode layer and a second electrode layer, in between an electrode layer and a capacitance reference surface, in between a shield layer and a component layer, or in another location.

A user may interact with the capacitance module by touching the capacitance reference surface 1101 with a finger, stylus, or other input method. The capacitance reference surface 1101 may be made out of glass, plastic, another material, or combinations thereof.

The first electrode layer 1102 may be located adjacent to the capacitance reference surface 1101. The first electrode layer 1102 includes a first set 1107a of electrodes arranged along the width of the layer. The electrodes in the first set 1107a may be transmit electrodes, sense electrodes, another type of electrodes, or combinations thereof. The electrodes in the first set 1107a may be made of copper, gold, another conductive material, or combinations thereof.

The second electrode layer 1103 may be located adjacent to the first electrode layer 1102. The second electrode layer 1102 includes a second set 1107b of electrodes arranged along the length of the layer. The electrodes in the second set 1107b of electrodes may be transmit electrodes, sense electrodes, another type of electrodes, or combinations thereof. The electrodes in the second set 1107b may be made of copper, gold, another conductive material, or combinations thereof.

The first set 1107a of electrodes and second set 1107b of electrodes may be arranged transverse from each other on their respective layers. Together, the first electrode layer 1102 and the second electrode layer 1103 form a mutual capacitance sensor. Other arrangements of the first and second sets of electrodes are possible to form a mutual capacitance sensor.

The mutual capacitance sensor formed by the first electrode layer 1102 and second electrode layer 1103 may be used to identify user input with the capacitance module. When a user touches the capacitance reference surface 1101 with a finger, stylus, or other input method, the mutual capacitance sensor senses the input. While the capacitance module 1100 includes a mutual capacitance sensor in this example, in other examples, a capacitance module may include a self-capacitance sensor, or another type of capacitance sensor.

The shield layer 1104 may be located adjacent to the second electrode layer 1103. The shield layer 1104 is constructed to block electrical signals that may interfere with the operation of the mutual capacitance sensor formed by the first electrode layer 1102 and second electrode layer 1103. The shield layer 1104 may be made of aluminum, fiberglass, another appropriate shielding material, or combinations thereof.

The component layer 1105 may be located adjacent to the shield layer 1104. The component layer 1105 may include a printed circuit board. The component layer 1105 may contain individual components 1108 that are used to operate the touchpad. Components may include but are not limited to a central processing unit (CPU), a digital signal processor (DSP), analog front end (AFE), an amplifier, a peripheral interface controller (PIC), another type of microprocessor, an integrated circuit, a field programmable gate array (FPGA), an application specific integrated circuit (ASIC), a combination of logic gate circuitry, other types of digital or analog electrical components, or combinations thereof.

Haptic motors 1107 may be located adjacent to the component layer 1105. When activated, the haptic motors 1107 may vibrate, creating haptic feedback which may be felt through the capacitance reference surface 1101 by the user.

While the capacitance module 1100 includes four haptic motors 1107 in this example, in other examples, a capacitance module may include a different number of haptic motors. Additionally, while the haptic motors 1107 are arranged in the corners of the capacitance module 1100, in other examples, haptic motors may be located differently in a capacitance module. For example, a capacitance module may have a single haptic motor located underneath the center of the capacitance reference surface, two haptic motors located underneath the right and left side of the capacitance reference surface, two haptic motors located underneath the top and bottom sides of the capacitance reference surface, etc.

The haptic motors 1107 may be eccentric rotating mass (ERM) vibration motors, linear resonance actuator (LRA) motors, piezoelectric actuator motors, another type of haptic motor, or combinations thereof. In examples, where the haptic motors 1107 are piezoelectric actuator motors or certain other types of haptic motor, the haptic motors may also be as pressure sensors.

In some cases, the haptic motors 1107 may deliver a haptic feedback by vibrating all at once. In other cases, the haptic motors may activate at different times. Activating individual haptic motors one after another may reduce energy costs, improve a localized sensation of haptic feedback on the capacitance reference surface 1101, and minimize vibrations that are felt outside of the capacitance module 1100.

Activating individual haptic motors with signals of varying characteristics may reduce energy cost. In cases where a capacitance module creates haptic feedback by activating all haptic motors simultaneously each with a full strength, the haptic feedback may be felt throughout the entirety of a capacitance reference surface and perhaps felt by other components outside of the capacitance module. Haptic feedback may only be desired and/or perceived by a user at the location of user input on the reference capacitance surface. In some cases, it may be desirable to limit the individual haptic signals so that collective haptic signal is only limited to a sub-portion of the surface area of capacitance reference surface, such as the area equal to one or two fingertips. In some cases, any energy that generates a haptic feedback that can be felt by the user outside of such a limited region of the reference capacitance surface may be considered wasted energy. In contrast, if only a portion of the total haptic motors 1107 in the capacitance module 1100 are activated to produce a haptic feedback, the haptic feedback may only be perceived at or near the location of user input, saving energy and creating a more localized sensation of haptic feedback. In addition, activating only a portion of haptic motors may reduce vibrations felt outside of the capacitance module 1100.

Figure 12A:
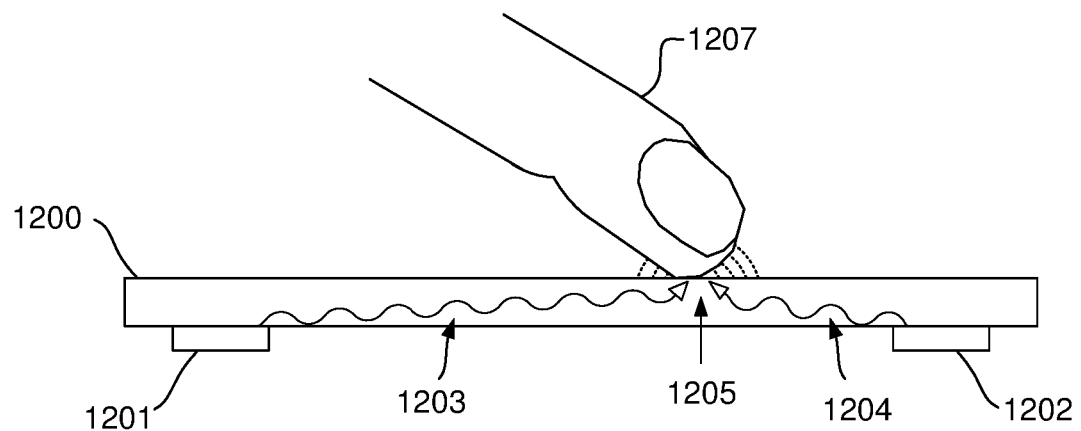
FIG. 12a depicts an example of a haptic feedback in accordance with the disclosure.

If only a portion of the total haptic motors 1107 are activated, the capacitance reference surface 1101 may vibrate with a weaker vibration than if all the haptic motors were activated, leading to a weaker sensation of haptic feedback. To offset this problem, haptic motors may be activated at different times. FIG. 12a depicts an example of haptic feedback in accordance with the disclosure. In this example, a finger 1207 touches a capacitance reference 1200 at a location of user input 1205. A first haptic motor 1201 and a second haptic motor 1202 are located underneath the capacitance reference surface 1200. The first haptic motor 1201 generates a first haptic signal 1203, and the second haptic motor generates a second haptic signal 1204. The first haptic signal 1203 and the second haptic signal 1204 may have amplitudes such that the vibrations they create in the capacitance reference surface 1200 are imperceptible to a user on their own, but when these signals are added to each other at the location of user input 1205, the two signals generate a haptic feedback 1207 which is perceptible to a user. In some cases, the first and the second haptic signals may constructively interfere with each other within the limited region of the user input thereby amplifying the signal. Such constructive interference may allow for even weaker haptic signals to be generated by the haptic motors while still having the effect of having generating larger signals.

Since the distance between the first haptic motor and the location of the user input is different than the distance between the second haptic motor and the location of the user input, one of the two haptic signals will arrive at the user input location before the other if both haptic motors send their signals at the same time. However, if the haptic motor farthest away from the user input's location is activated first the farther haptic signal may travel to target location while the closer haptic motor is still inactivated. The second haptic motor may be activated at the time necessary for the second haptic signal to arrive at the target location as the same time as the first haptic signal. This inactivity period between the activation of the first haptic motor and the second haptic motor may an activation delay for the closer haptic motor. The activation delay may also save energy by preventing one of the signals to arrive at the user input location before the other thereby wasting energy that is not needed to create the desired haptic effect.

Figure 12B:
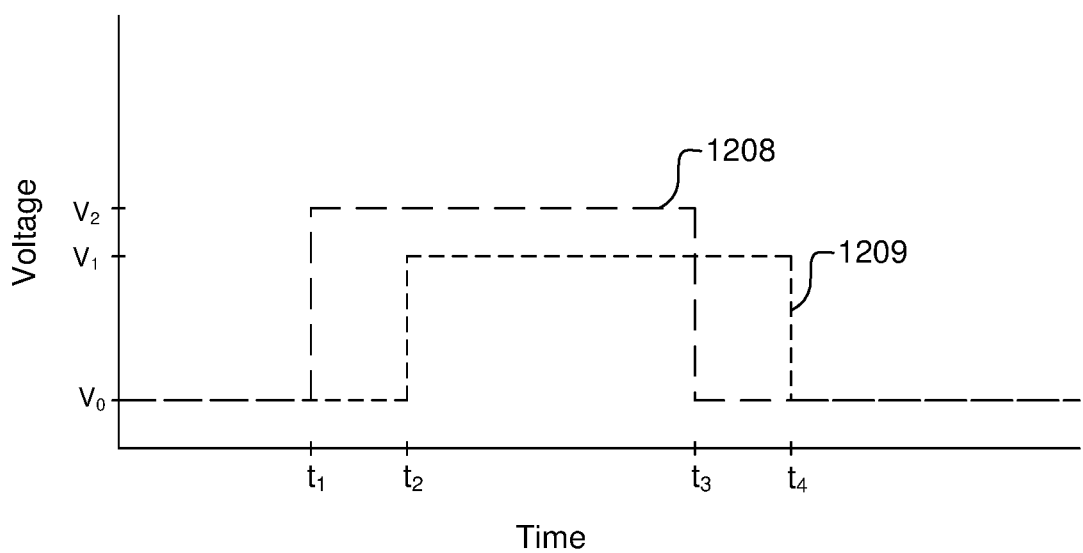
FIG. 12b depicts an example of a voltage graph in accordance with the disclosure.

FIG. 12b depicts an example of a voltage graph in accordance with the disclosure. In this graph, the voltage of the first haptic motor 1201 is represented by the line 1208, and the voltage of the second haptic motor 1202 is represented by the line 1209. The voltage is depicted with respect to time.

The first haptic motor 1201 and second haptic motor 1202 may be activated at different times. In this example, the first haptic motor 1201 is activated at $t_1$ and deactivated at $t_3$. The second haptic motor 1202 is activated at $t_2$ and deactivated at $t_4$. In other words, the first haptic motor 1201 generates the first haptic signal 1203 before the second haptic motor 1202 generates the second haptic signal 1204. Determining when to activate a haptic motor may be based on the distance between the haptic motor and the desired location of haptic feedback. Because a haptic signal takes a finite time to travel through a capacitance module to the location of haptic feedback, a haptic motor that is further away from the location of haptic feedback may be activated before a haptic motor that is closer to the location of haptic feedback so that their respective haptic signals reach the location of haptic feedback at the same time. In this example, the first haptic motor 1201 is further away from the location of user input 1205 than the second haptic motor 1202, so the first haptic motor is activated before the second.

The first haptic motor 1201 and second haptic motor 1202 may be activated with different voltages. In this example, the first haptic motor 1201 is activated with a voltage of $v_2$ and the second haptic motor 1202 is activated with a voltage of $v_1$. The voltage of a haptic motor may correspond to the amplitude of the haptic signal generated by the motor. A higher voltage may correspond to a higher amplitude, and a lower voltage may correspond to a lower amplitude. Because a haptic signal may dissipate and decrease in amplitude as it travels further from a haptic motor, haptic motors that are further from a desired location of haptic feedback may be activated with higher voltages than haptic motors that are closer to the desired location of haptic feedback. In this example, the first haptic motor 1201 is further away from the location of user input 1205 than the second haptic motor 1202, so the first motor is activated with a higher voltage than the second.

Figure 13A:
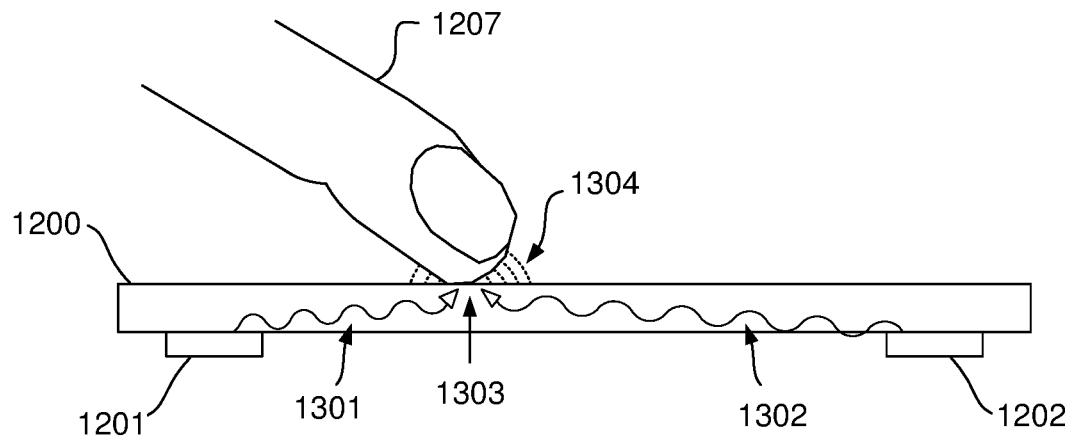
FIG. 13a depicts an example of a haptic feedback in accordance with the disclosure.

FIG. 13a depicts an example of a haptic signal in accordance with the disclosure. In this example, a finger 1207 touches the capacitance reference surface 1200 at a location of user input 1303. The first haptic motor 1201 generates a first haptic signal 1301 and the second haptic motor generates a second haptic signal 1302. The first haptic signal 1301 and the second haptic signal 1302 generate a haptic feedback 1304 at the location of user input 1303. In this example, the first haptic motor 1201 is closer to the location of user input 1303 than the second haptic motor 1202.

Figure 13B:
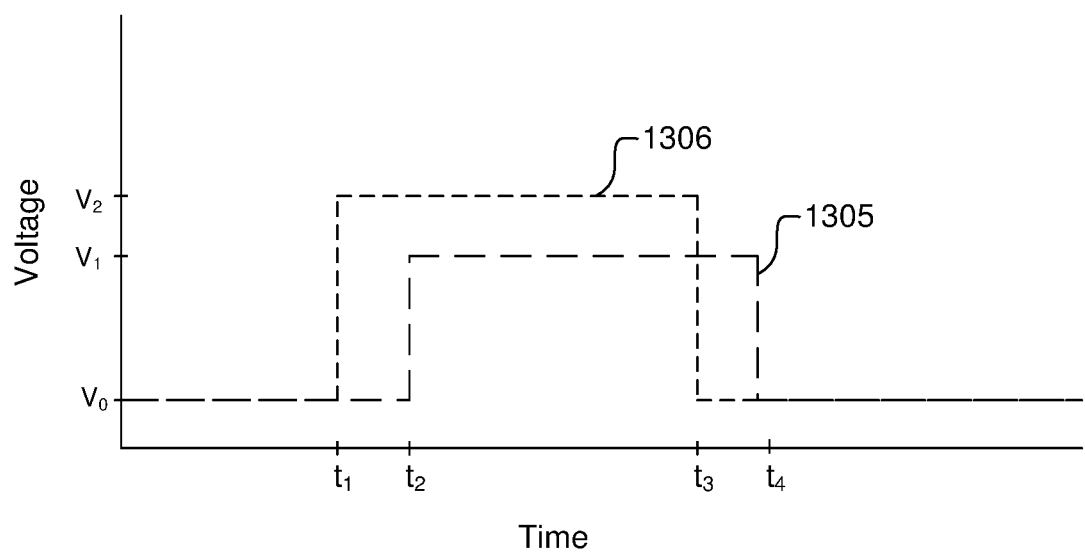
FIG. 13b depicts an example of a voltage graph in accordance with the disclosure.

FIG. 13b depicts an example of a voltage graph in accordance with the disclosure. In this example, the voltage of the first haptic motor 1201 is represented by the line 1305, and the voltage of the second haptic motors 1202 is represented by the line 1306. The voltage is depicted with respect to time. In this example, the first haptic motor is activated at $t_2$ and deactivated at $t_4$ with an activation voltage of $v_1$. The second haptic motor is activated at $t_1$ and deactivated at $t_3$ with an activation voltage of $v_2$.

Figure 14A:
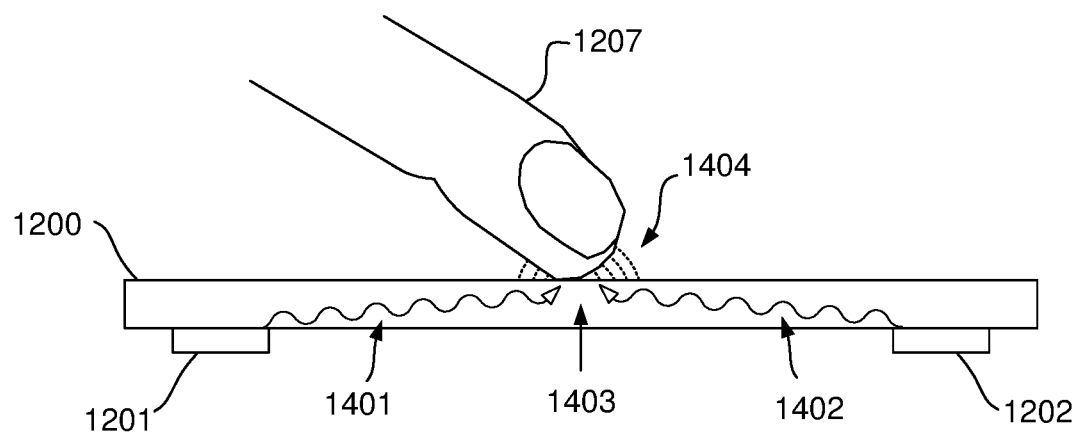
FIG. 14a depicts an example of a haptic feedback in accordance with the disclosure.

FIG. 14a depicts an example of a haptic feedback in accordance with the disclosure. In this example, the finger 1207 touches the capacitance reference surface 1200 at a location of user input 1403. The first haptic motor 1201 generates a first haptic signal 1401 and the second haptic motor 1202 generates a second haptic signal 1402. The first haptic signal 1401 and the second haptic motors 1402 interfere at the location of user input 1403 to form a haptic feedback 1404.

Figure 14B:
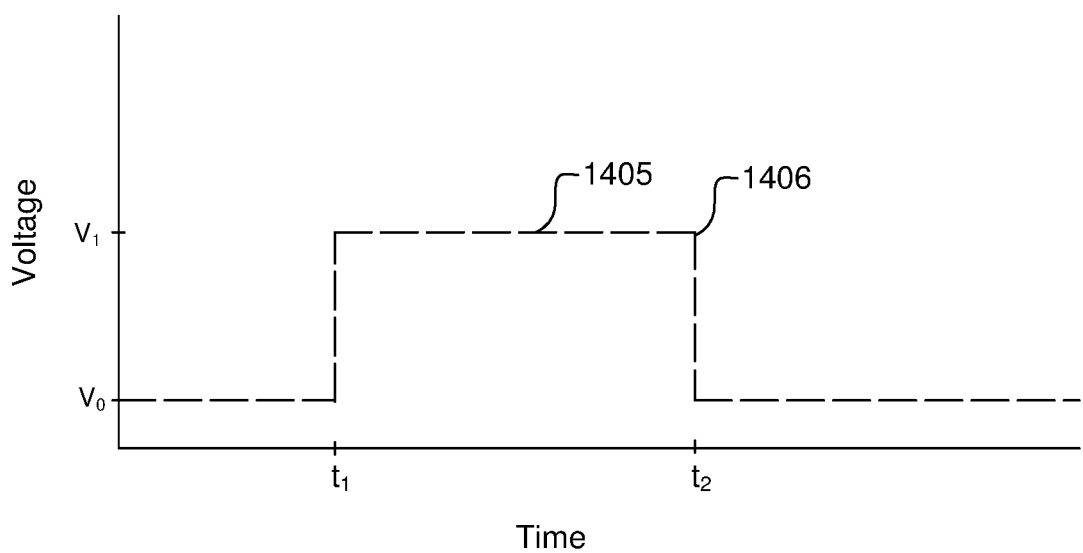
FIG. 14b depicts an example of a voltage graph in accordance with the disclosure.

FIG. 14b depicts an example of a voltage graph in accordance with the disclosure. In this example, the voltage of the first haptic motor 1201 is represented by the line 1405, and the voltage of the second haptic motor 1202 is represented by the line 1406. In this example, the voltage times and activation voltages for the first haptic motor 1201 and the second haptic motor 1202 are the same. In some examples, it may be desirable for the first haptic signal and the second haptic signal to have equal voltage strengths when the location of user input 1403 is equidistant from both of the motors. In the illustrated example, both the first haptic motor 1201 and the second haptic motor 1202 are activated at $t_1$ and deactivated at $t_2$ with an activation voltage of $v_1$.

A haptic signal generated by one haptic motor may have a different phase, amplitude, wavelength, or frequency than a haptic signal generated by another haptic motor. FIGS. 15-18 depict examples of displacement graphs of different haptic signals that depict the differences of waveform characteristics between the different haptic motors that contribute to the overall haptic effect at the user input location.

Figure 15:
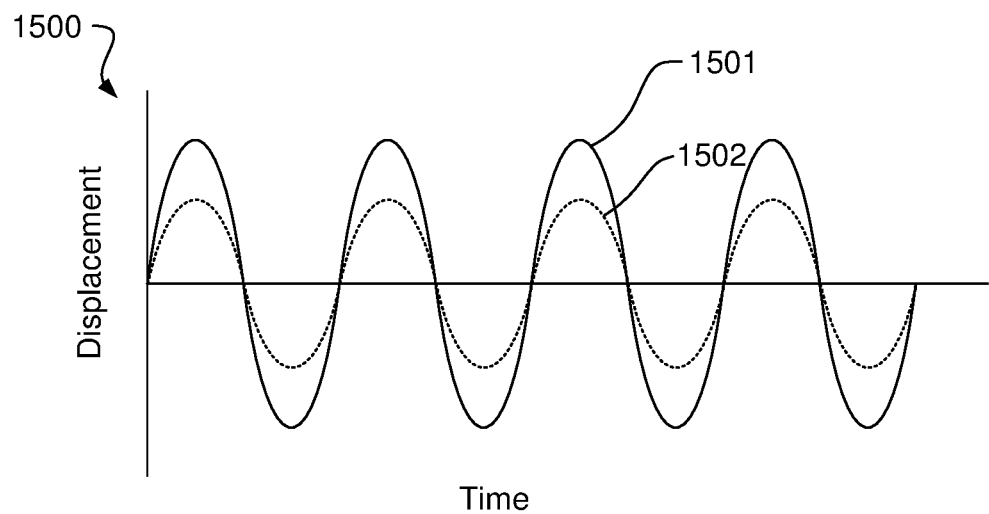
FIG. 15 depicts an example of a displacement graph in accordance with the disclosure.

FIG. 15 depicts an example of a displacement graph 1500 including a first haptic signal 1501 and a second haptic signal 1502. In this example, the first haptic signal 1501 and second haptic signal 1502 share the same phase, wavelength, and frequency, but the first haptic signal has a greater amplitude than the second haptic signal.

Figure 16:
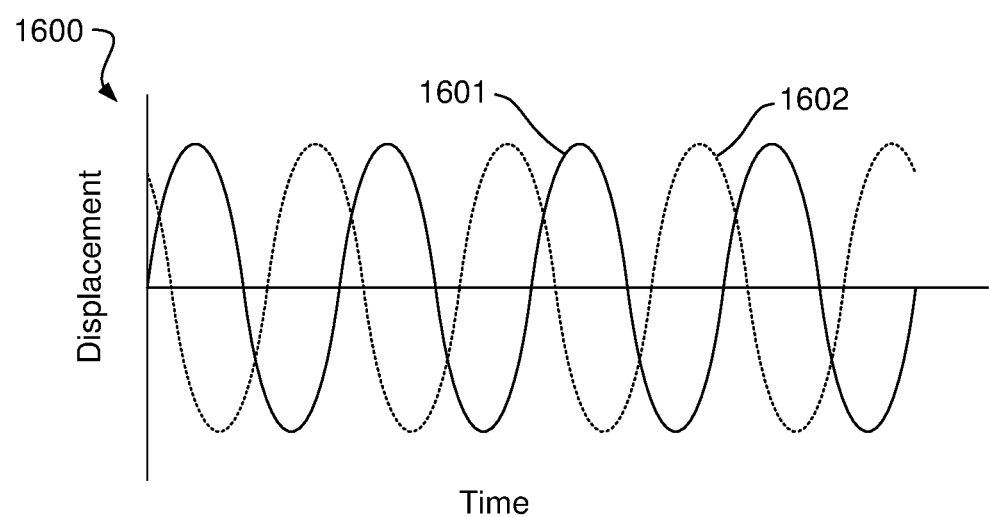
FIG. 16 depicts an example of a displacement graph in accordance with the disclosure.

FIG. 16 depicts an example of a displacement graph 1600 including a first haptic signal 1601 and a second haptic signal 1602. In this example, the first haptic signal 1601 and second haptic signal 1602 share the same wavelength, frequency, and amplitude, but the two signals have different phases.

Figure 17:
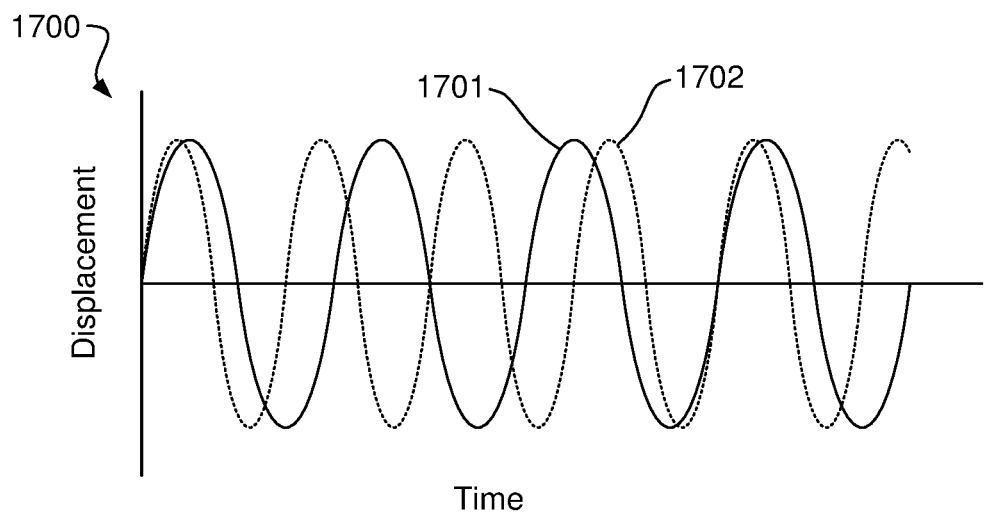
FIG. 17 depicts an example of a displacement graph in accordance with the disclosure.

FIG. 17 depicts an example of a displacement graph 1700 including a first haptic signal 1701 and a second haptic signal 1702. In this example, the first haptic signal 1701 and the second haptic signal 1702 have the same amplitude and phase, but they have different wavelengths and frequencies.

Figure 18:
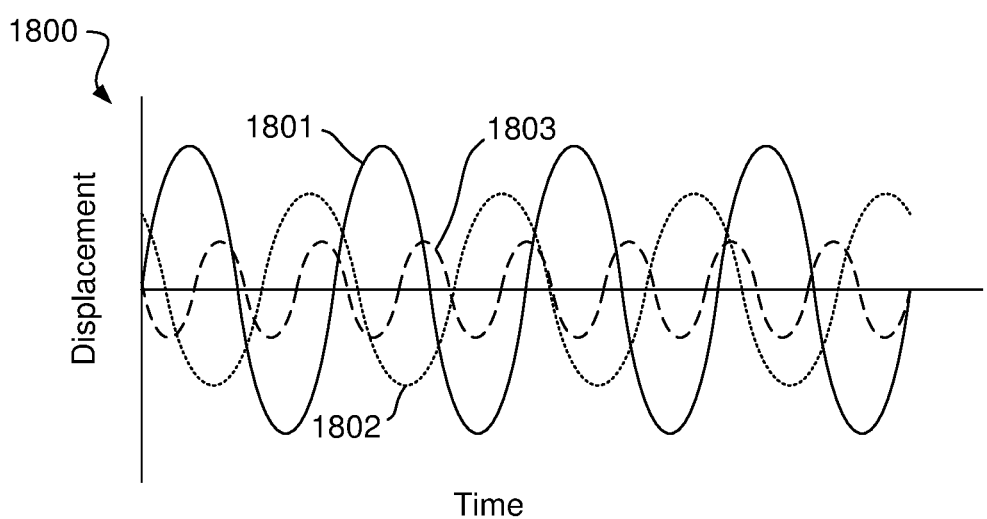
FIG. 18 depicts an example of a displacement graph in accordance with the disclosure.

FIG. 18 depicts an example of a displacement graph 1800 including a first haptic signal 1801, a second haptic signal 1802, and a third haptic signal 1803. In this example, each of the three haptic signals 1801,1802,1803 has a different phase, amplitude, wavelength, and frequency.

Figure 19:
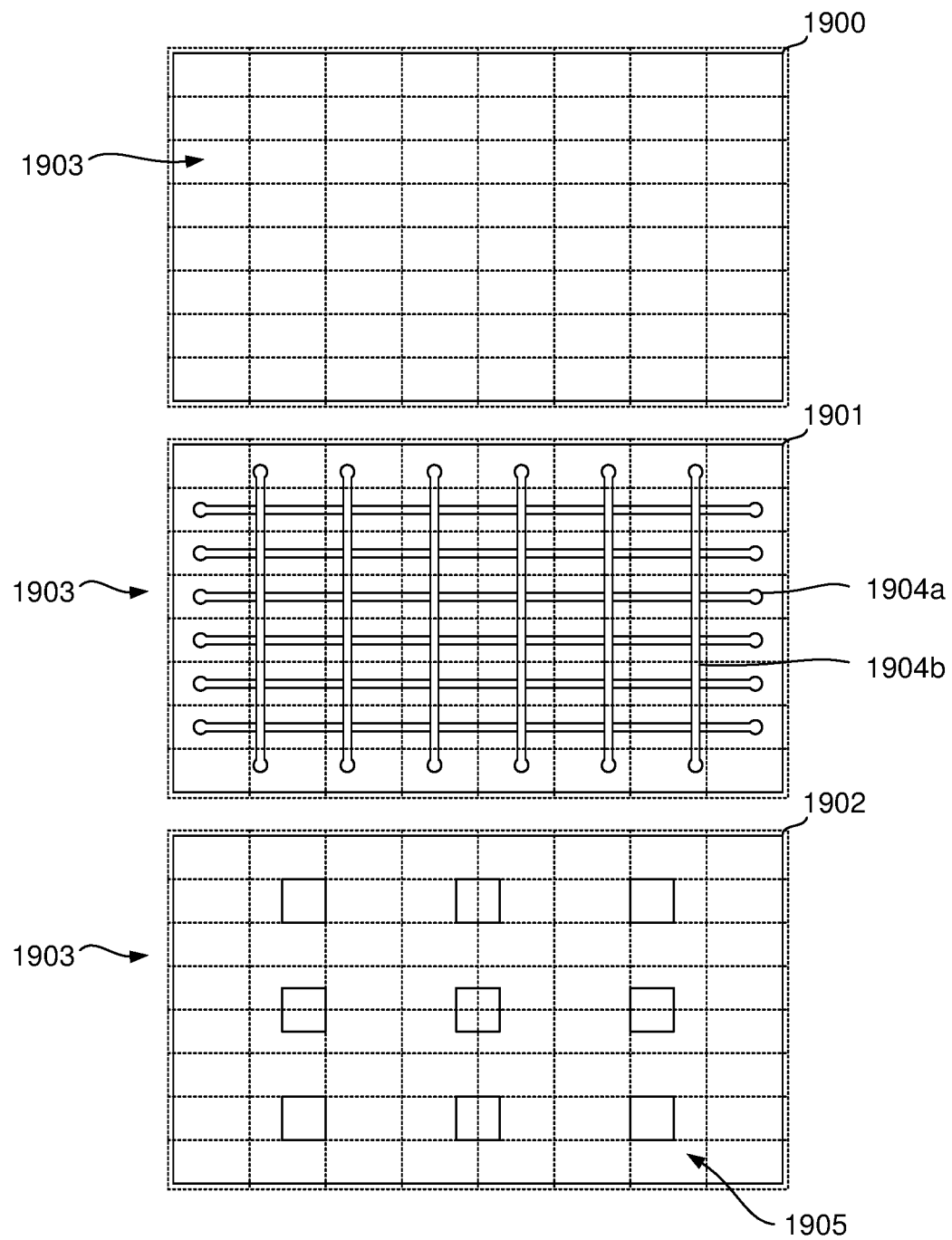
FIG. 19 depicts an example of pre-programmed input regions in accordance with the disclosure.

FIG. 19 depicts an example of pre-programmed input regions in accordance with the disclosure. A capacitance reference surface 1900, a mutual capacitance sensor 1901, and a haptic layer 1902 are depicted. A dotted grid over each element represents a set of input regions 1903. The mutual capacitance sensor 1901 may include a first set 1904a and a second set 1904b of electrodes. The haptic layer 1902 includes a set of haptic motors 1905.

In some examples, a capacitance module may determine which haptic motors to activate and what order to activate the haptic motors in response to determining the user input location. While this approach may provide haptic feedback that is accurate to the desired location of haptic feedback, calculating the distances of haptic motors for every appropriate input may be resource intensive and may result in the capacitance module performing more slowly. To solve this problem, input regions may be pre-programmed in a capacitance module. If the location of user input falls within a pre-programmed region, a capacitance module may select a predetermined timing and predetermined waveform characteristics to be activated by the haptic motors from stored pre-programmed instructions. Such preprogrammed instructions may be stored in the memory of the controller in the capacitance module, other memory associated with a device in which the capacitance module is incorporated, memory associated with a networked device, memory associated with a cloud device, other memory, or combinations thereof. This system may present a trade-off of haptic feedback precision in exchange for lower processing costs.

Figure 20:
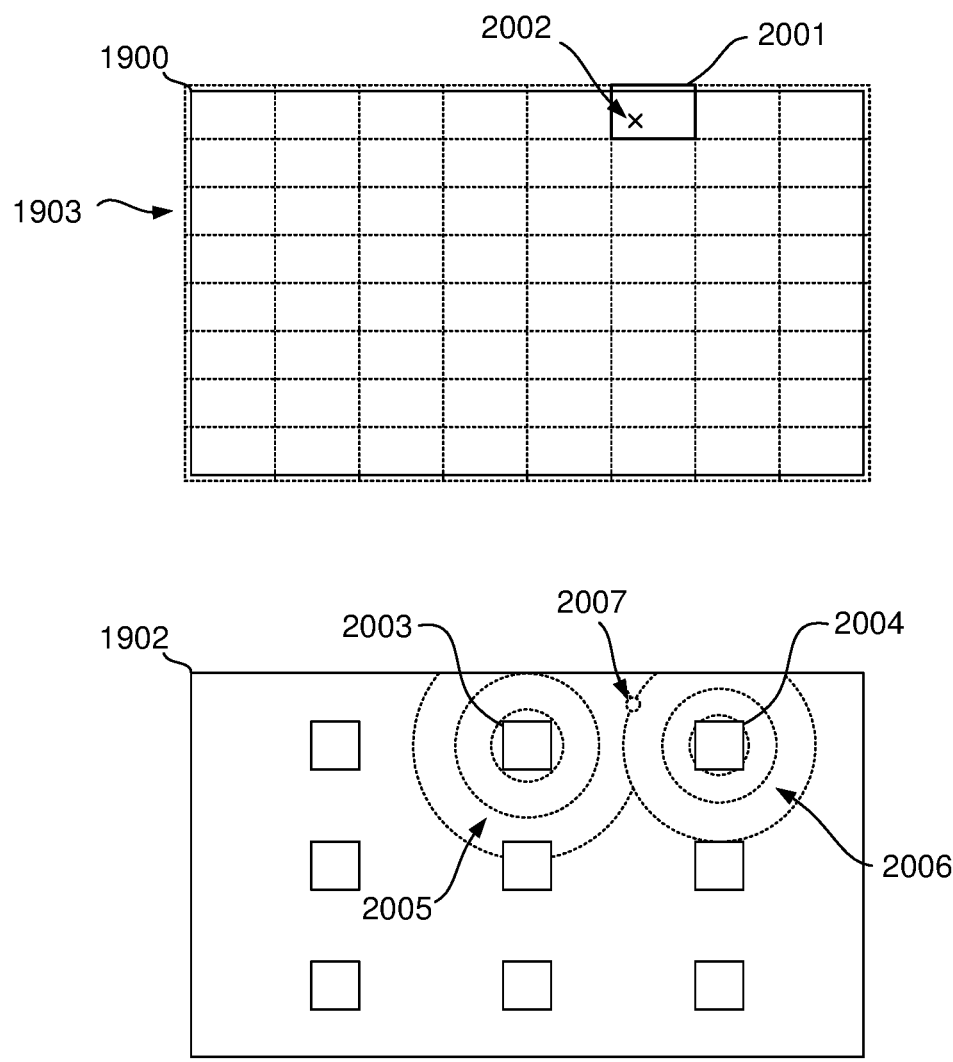
FIG. 20 depicts an example of a haptic feedback in accordance with the disclosure.

FIG. 20 depicts an example of a haptic feedback in accordance with the disclosure. In this example, a user input 2002 on the capacitance reference surface 1900 is within an input region 2001 of the set of input regions 1903. On the haptic layer 1902, a first haptic motor 2003 generates a first haptic signal 2005 and a second haptic motor 2004 generates a second haptic signal 2006. The first haptic signal 2005 and the second haptic signal 2006 interfere at the location of user input 2002 to create a haptic feedback 2007.

The first haptic signal 2005 and second haptic signal 2006 may have different amplitudes, phases, wavelengths, and frequencies as determined by the pre-programmed instructions associated with the input region 2001. The timing of the activation of the first haptic motor 2003 and second haptic motor 2004 may be determined by the pre-programmed instructions associated with the input region 2001. In this example, the first haptic signal 2005 has a greater wavelength than the second haptic signal 2006 because the first haptic motor 2003 is located further away from the input region 2001 than the second haptic motor 2004.

While in this example the haptic feedback 2007 is created from two haptic signals 2005,2006, in other examples, a haptic feedback may be created from a different number of haptic signals. For example, a haptic feedback may be created from just one haptic signal, two haptic signals, three haptic signals, four haptic signals, another number of haptic signals, or combinations thereof.

Figure 21:
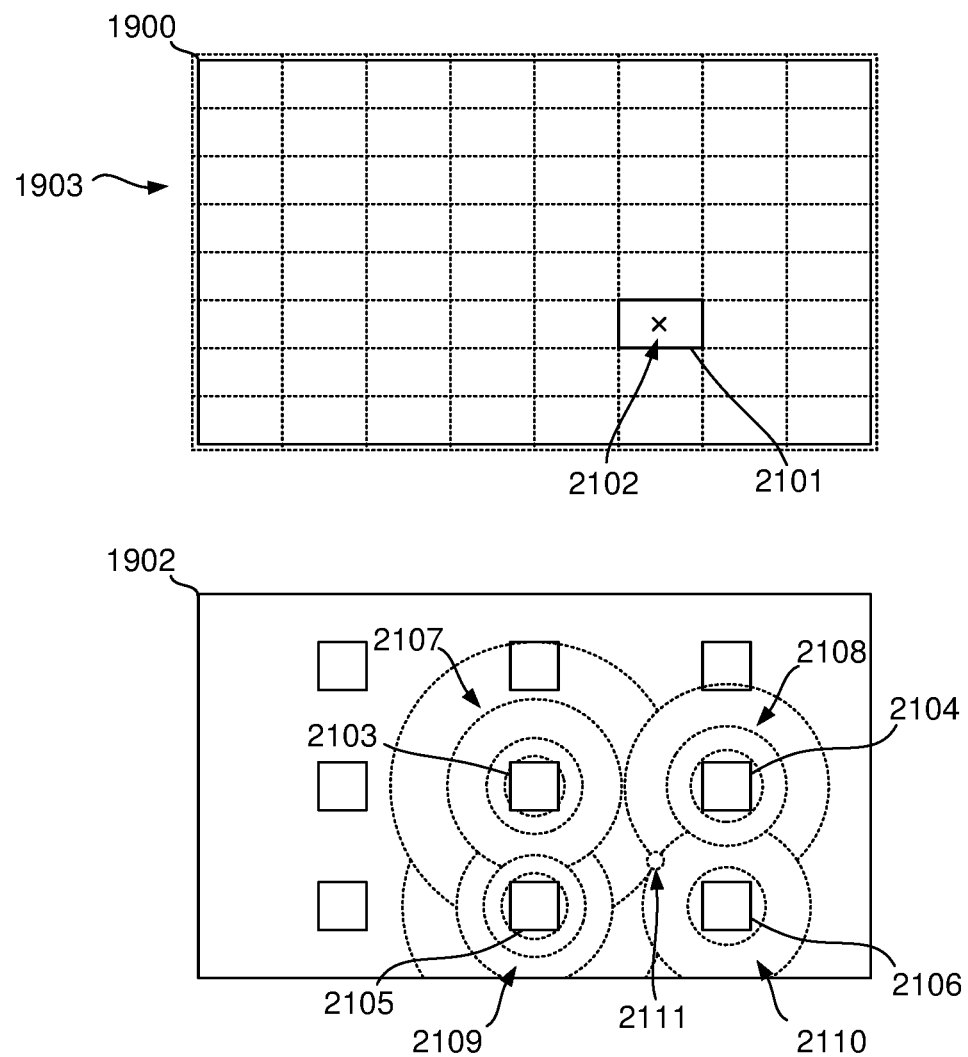
FIG. 21 depicts an example of a haptic feedback in accordance with the disclosure.

FIG. 21 depicts an example of a haptic feedback in accordance with the disclosure. In this example, a user input 2102 on the capacitance reference surface 1900 is within an input region 2101 of the set of input regions 1903. On the haptic layer 1902, a first haptic motor 2103 generates a first haptic signal, a second haptic motor 2104 generates a second haptic signal 2108, a third haptic motor 2105 generates a third haptic signal 2109, and a fourth haptic motor 2106 generates a fourth haptic signal 2110. The first haptic signal 2107, second haptic signal 2108, third haptic signal 2109, and fourth haptic signal 2110 interfere at the location of user input 2102 to create a haptic feedback 2111.

The haptic signals 2107-2110 may each have different amplitudes, phases, wavelengths, and frequencies as determined by the pre-programmed instructions associated with the input region 2101. The timing of the haptic signals 2107-2110 may be determined by the pre-programmed instructions associated with the input region 2101. The pre-programmed instructions which execute the activation of the haptic motors 2103-2106 may be programmed based, in part, on the distance between the input region 2101 and each of the haptic motors.

Figure 22:
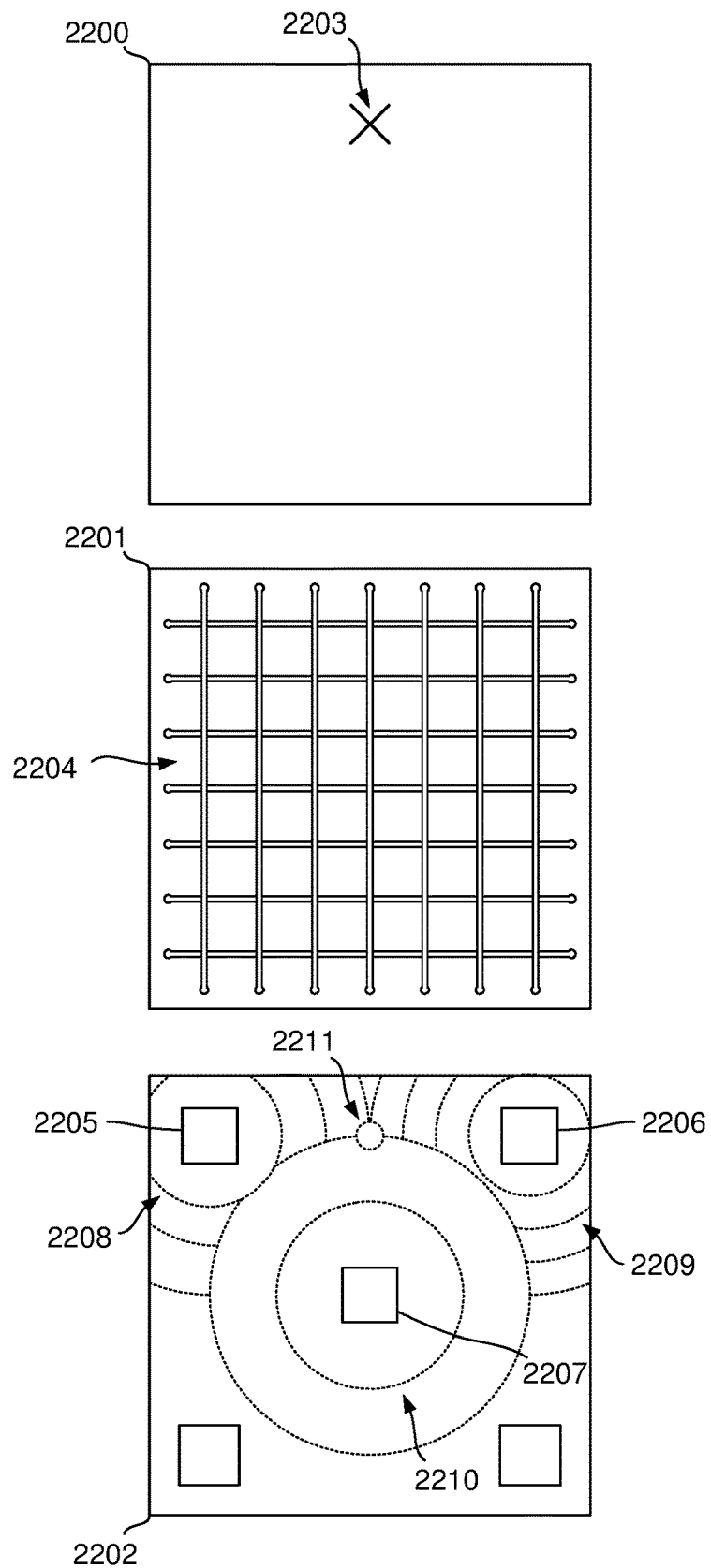
FIG. 22 depicts an example of a user input on a capacitance module in accordance with the disclosure.

FIG. 22 depicts an example of a user input on a capacitance module in accordance with the disclosure. In this example, the capacitance module includes a capacitance reference surface 2200, a capacitive sensor layer 2201, and a haptic layer 2202. While three elements are identified in the capacitance module in this example, in other examples, a capacitance module may include more or less elements.

The capacitance reference surface 2200 is located adjacent to the capacitive sensor layer 2201. A user may interact with the capacitance module by touching the capacitance reference surface 2200 with a finger or other input method. In this example, a location of user input 2203 is identified on the capacitance reference surface 2200.

The capacitive sensor layer 2201 is located in between the capacitance reference surface 2200 and the haptic layer 2202. The capacitive sensor layer 2201 contains a mutual capacitance sensor 2204. While in this example, the capacitive sensor layer 2201 includes a mutual capacitance sensor 2204, in other examples, a capacitive sensor layer 2201 may include a different type of capacitive sensor. For example, a capacitive sensor layer may include a mutual capacitance sensor, a self-capacitance sensor, another type of capacitive sensor, or combinations thereof.

The mutual capacitance sensor 2204 may be used to detect user input on the capacitance reference surface 2200 of the capacitance module. The capacitance module may use the information collected by the mutual capacitance sensor 2204 to determine the location and timing of a haptic feedback response.

The haptic layer 2202 is located adjacent to the capacitive sensor layer 2201. The haptic layer 2202 includes five haptic motors. While five haptic motors are identified in the haptic layer 2202, in other examples, a capacitance module may incorporate a different number of haptic motors.

In this example, a first haptic motor 2205 generates a first haptic signal 2208, a second haptic motor 2206 generates a second haptic signal 2209, and a third haptic motor 2207 generates a third haptic signal 2210. The first haptic signal 2208, second haptic signal 2209, and third haptic signal 2210 interfere at the location of user input 2203 to create a haptic feedback 2211.

In this example, the location of user input 2203 is equidistant from the first haptic motor 2205, second haptic motor 2206, and third haptic motor 2207. As shown in FIGS. 23a-23e, the first haptic signal 2208, second haptic signal 2209, and third haptic signal 2210 may each have different characteristics such that they are imperceptible on their own, and perceptible at the location of user input 2203 where the three signals interfere with each other to create the haptic feedback 2211.

Figure 23A:
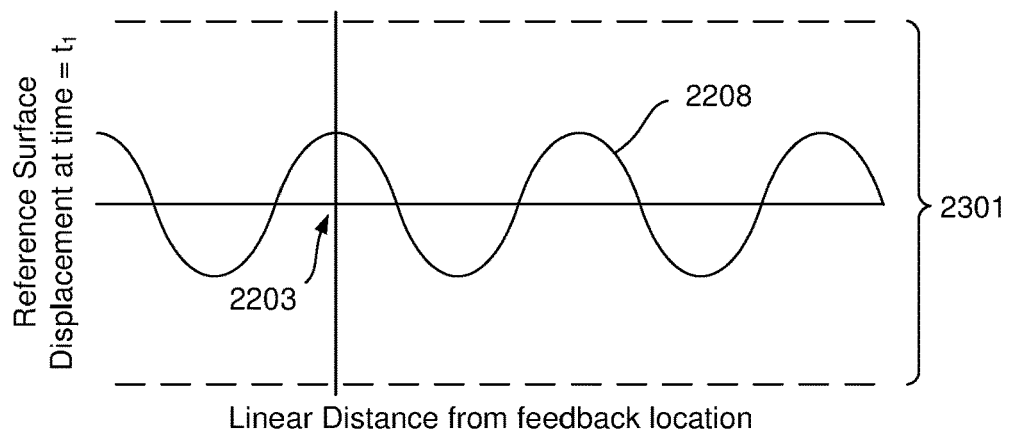
FIG. 23a depicts a displacement versus distance graph in accordance with the disclosure.

FIG. 23a depicts an example of a displacement versus distance graph in accordance with the disclosure. In this example, the first haptic signal 2208 depicts an example of reference surface displacement versus linear distance from the location of user input 2203. The vertical axis represents reference surface displacement. The horizontal axis represents linear distance from the location of user input 2203 to the first haptic motor 2205. The location of user input 2203 is represented as x=0. The dashed lines on the top and bottom of the graph represent a perception threshold 2301. If the reference surface displacement of a haptic signal exceeds the perception threshold 2301, that haptic signal may be felt by a user. In the example FIG. 23a, the first haptic signal 2208 does not exceed the perception threshold 2301, therefore, it is possible that the first haptic signal may not be felt by the user.

Figure 23B:
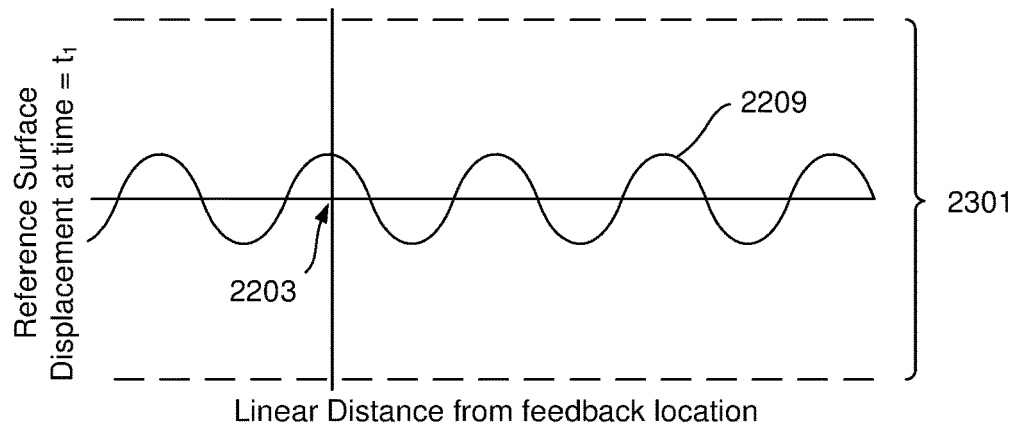
FIG. 23b depicts a displacement versus distance graph in accordance with the disclosure.

FIG. 23b depicts an example of a displacement versus distance graph in accordance with the disclosure. In this example, the second haptic signal 2209 is depicted as an example of reference surface displacement versus linear distance from the location of user input 2203. In this example, the second haptic signal 2209 does not exceed the perception threshold 2301, therefore, it is possible that in some cases the second haptic signal may not be felt by the user.

Figure 23C:
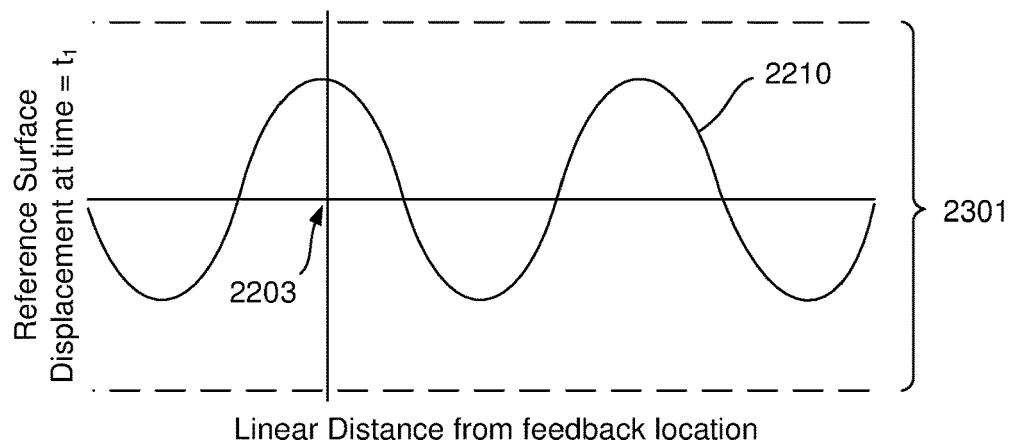
FIG. 23c depicts a displacement versus distance graph in accordance with the disclosure.

FIG. 23c depicts an example of a displacement versus distance graph in accordance with the disclosure. In this example, the third haptic signal 2210 is depicted as an example of reference surface displacement versus linear distance from the location of user input 2203. In this example, the third haptic signal 2210 does not exceed the perception threshold 2301, therefore, it is possible that the third haptic signal may not be felt by the user.

It should be noted that while the first, second, and third haptic signals 2208-2210 are equidistant from the location of user input 2210, they do not share the same characteristics. For example, the amplitude of the third haptic signal 2210 has a greater amplitude than either the first haptic signal 2208 or second haptic signal 2209. The second haptic signal 2209 has a greater frequency and shorter wavelength than either the first haptic signal 2208 or third haptic signal 2210. Varying the characteristics of different haptic signals may be suited to prevent a haptic feedback from being perceived in a location other than the desired feedback location. By varying the characteristics of haptic signals, the perception of feedback may be reduced at undesired locations and increased at or near desired locations.

Figure 23D:
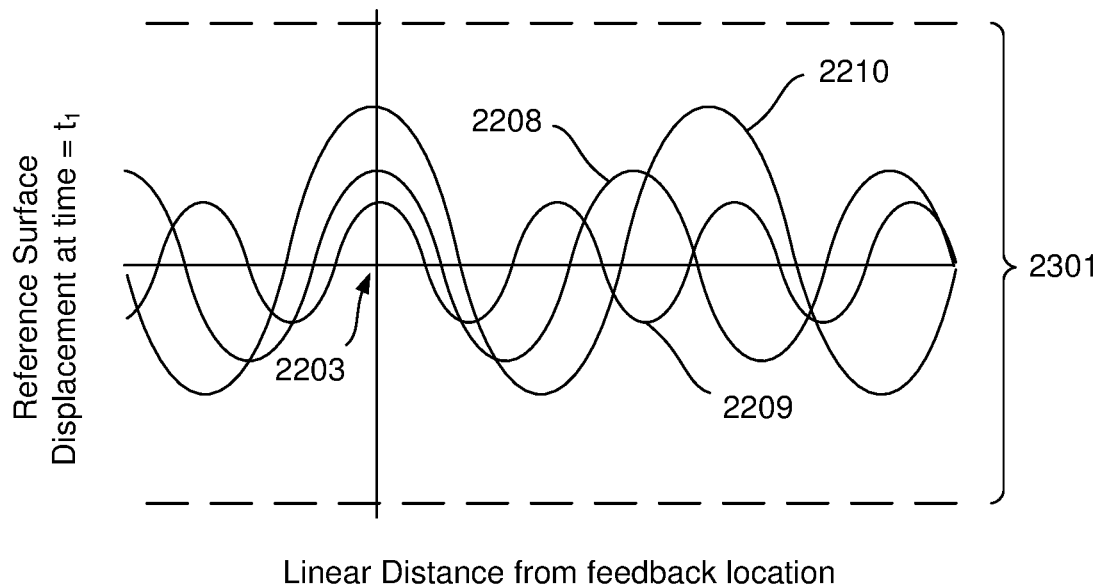
FIG. 23d depicts a displacement versus distance graph in accordance with the disclosure.

FIG. 23d depicts an example of a displacement versus distance graph in accordance with the disclosure. In this example, the first haptic signal 2208, second haptic signal 2209, and third haptic signal 2210 depicted on the same graph superimposed on each other.

Figure 23E:
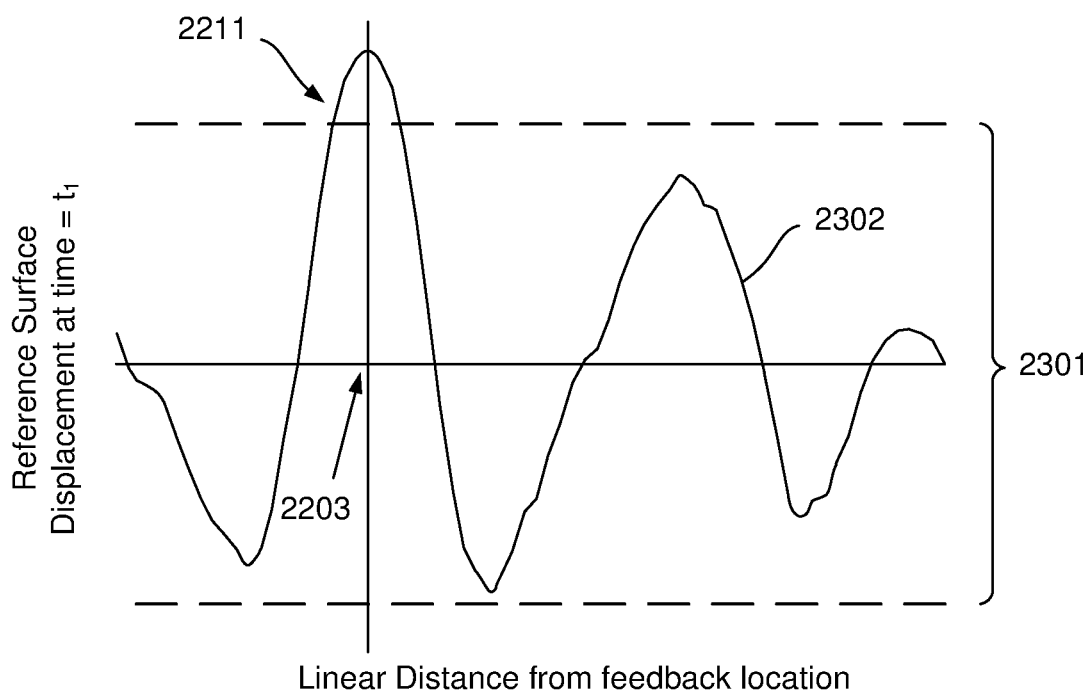
FIG. 23e depicts a displacement versus distance graph in accordance with the disclosure.

FIG. 23e depicts an example of a displacement versus distance graph in accordance with the disclosure. In this example, a composite signal 2302 is the sum of the first haptic signal 2208, second haptic signal 2209, and third haptic signal 2210. The composite signal 2302 represents how each of the individual haptic signals 2208-2210 may constructively and destructively interfere to create the haptic feedback 2211. As shown in FIG. 23e, the composite signal 2302 exceeds the perception threshold 2301 at the location of user input 2302. Therefore, the composite signal 2302 may be felt by a user at the location of user input 2302 as haptic feedback 2211.

Figure 24:
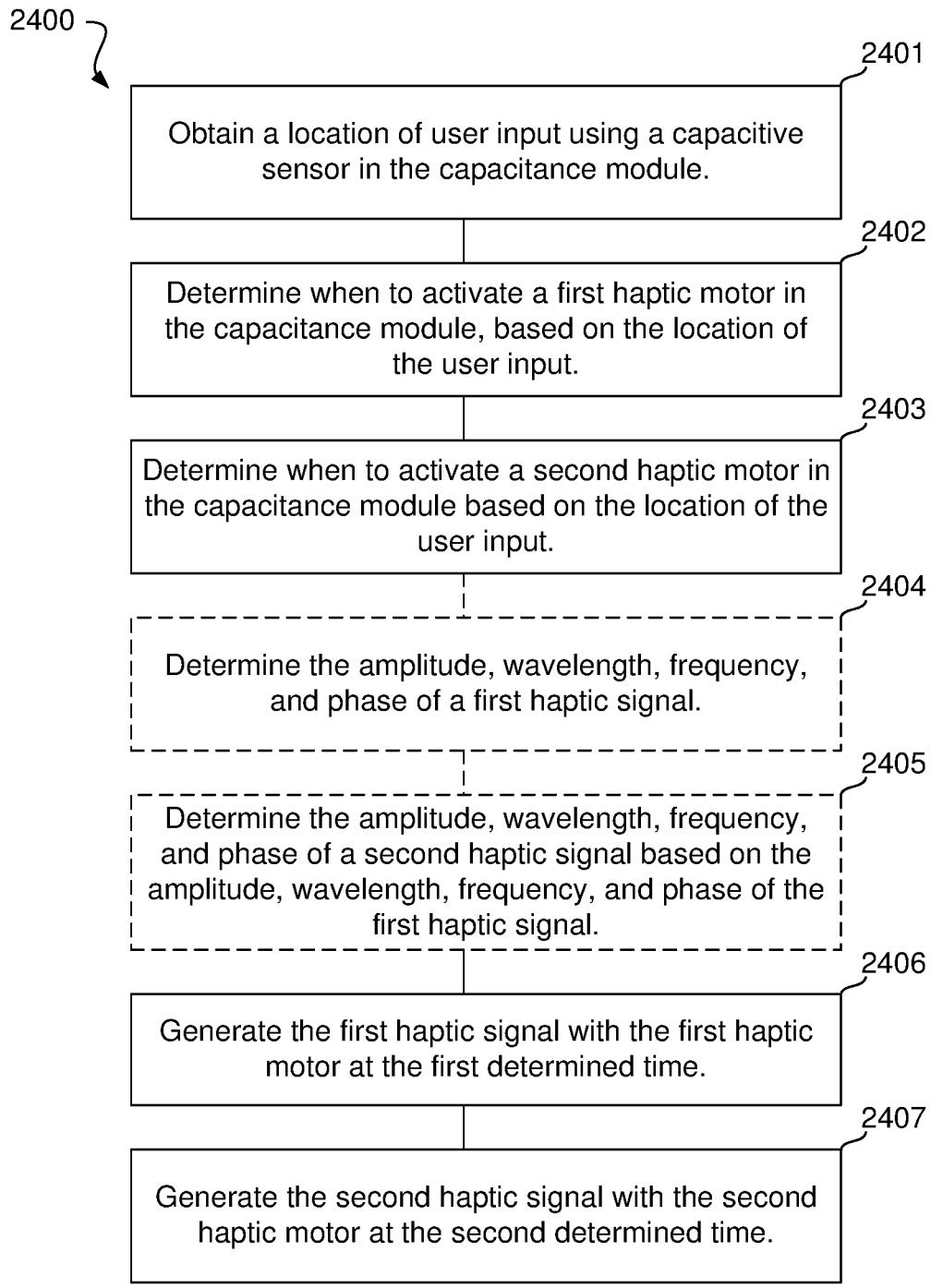
FIG. 24 depicts a method for delivering a haptic feedback with a capacitance module in accordance with the disclosure.

FIG. 24 depicts a method 2400 for delivering a haptic feedback with a capacitance module in accordance with the disclosure. This method 2400 may be performed based on the description of the devices, modules, and principles described in relation to FIGS. 1-23. In this example, the method 2400 may include delivering a haptic feedback with a capacitance module includes obtaining 2401 a location of user input using a capacitive sensor in the capacitance module, determining 2402 when to activate a first haptic motor in the capacitance module, based on the location of the user input, determining 2403 when to activate a second haptic motor in the capacitance module based on the location of user input, generating 2406 the first haptic signal with the first haptic motor at the first determined time, and generating 2407 the second haptic signal with the second haptic motor at the second determined time. The method 2400 may optionally include determining 2404 the amplitude, wavelength, frequency, and phase of the first haptic signal. The method 2400 may optionally include determining 2405 the amplitude, wavelength, frequency, and phase of the second haptic signal based on the amplitude, wavelength, frequency, and phase of the first haptic signal.

It should be noted that while methods, systems, and devices discussed may describe implementations of capacitance modules as touchpads in laptop devices, the disclosed methods, systems, and devices may be implemented into other devices that include a capacitance module. Devices that may implement the methods, systems, and devices discussed above may include but are not limited to laptop devices, smartphone devices, video-game controller devices, kiosk devices, touchscreen devices, other devices, or combinations thereof.

For example, in cases where a video-game controller includes a capacitance module with haptic motors, the motors may deliver haptic feedback as described above. In another example, in cases where a smartphone includes a touch screen with haptic motors, the motors may deliver haptic feedback as described above.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
   a capacitive sensor;
   a first haptic motor;
   a second haptic motor;
   wherein the first haptic motor and second haptic motor are in mechanical communication with the capacitive sensor;
   controlling resources connected to the capacitive sensor and the plurality of haptic motors with memory;
   wherein the memory contains programmed instructions that cause the controlling resources, when activated, to:
   determine when to activate the first haptic motor in response to a user input;
   determine when to activate the second haptic motor in response to the user input;
   generate a first haptic signal with the first haptic motor at a first determined time; and
   generate a second haptic signal with the second haptic motor at a second determined time;
   wherein the first haptic signal and second haptic signal constructively interfere at the location of user input.

2. The module of claim 1, wherein the programmed instructions cause the controlling resources, when activated, to:
   determine the waveform characteristics of the first haptic signal; and
   determine the waveform characteristics of the second haptic signal based on the waveform characteristics of the first haptic signal.

3. The module of claim 1, wherein the first haptic signal and second haptic signal generate a haptic feedback that is just tangible at and/or near the location of user input.

4. The module of claim 1, wherein the first haptic signal and second haptic signal are timed to arrive at the location of user input at the same time.

5. The module of claim 1, wherein:
   determining when to activate the first haptic motor includes determining a distance between the user input and the first haptic motor; and
   determining when to activate the second haptic motor includes determining a distance between the user input and the second haptic motor.

6. The module of claim 1, wherein the capacitive sensor includes at least one pre-defined region, wherein the first determined time and second determined time are pre-programmed based, at least in part, on the at least one pre-defined region.

7. The module of claim 1, wherein the first determined time and the second determined time have the same value.

8. The module of claim 1, wherein the capacitance module is a touchpad.

9. The module of claim 1, wherein the first haptic signal and the second haptic signal are tuned to minimize vibrations perceptible outside of the area defined by the capacitance module.

10. A method for delivering a haptic feedback with a capacitance module, comprising:
    obtaining a location of user input using a capacitive sensor in the capacitance module;
    determining when to activate a first haptic motor in the capacitance module based on the location of the user input;
    determining when to activate a second haptic motor in the capacitance module based on the location of the user input;
    generating a first haptic signal with the first haptic motor at the first determined time; and
    generating a second haptic signal with the second haptic motor at the second determined time;
    wherein the haptic feedback comprises the first haptic signal and second haptic signal;
    wherein the first haptic signal and second haptic signal constructively interfere at the location of user input.

11. The method of claim 10, further comprising:
    determining the waveform characteristics of the first haptic signal; and
    determining the waveform characteristics of the second haptic signal based on the waveform characteristics of the first haptic signal.

12. The method of claim 10, wherein the first haptic signal and second haptic signal generate a haptic feedback that is just perceptible at and/or near the location of user input.

13. The method of claim 10, wherein the first haptic signal and second haptic signal are timed to arrive at the location of user input at the same time.

14. The method of claim 10, wherein:
    determining when to activate the first haptic motor includes determining a distance between the user input and the first haptic motor; and
    determining when to activate the second haptic motor includes determining a distance between the user input and the second haptic motor.

15. The method of claim 10, wherein:
    the capacitive sensor includes at least one pre-defined region; and the first determined time and second determined time are pre-programmed based, in part, on the predefined region.

16. The method of claim 10, wherein the capacitance module is a touchpad.

17. A computer-program product for generating a haptic feedback using a capacitance module, the computer-program product comprising a non-transitory, computer readable medium storing instructions executable by a processor to:
  obtain a location of user input using a capacitive sensor in the capacitance module;
  determine when to activate a first haptic motor in the capacitance module based on the location of the user input;
  determine when to activate a second haptic motor in the capacitance module based on the location of the user input;
  generate a first haptic signal with the first haptic motor at the first determined time; and
  generate a second haptic signal with the second haptic motor at the second determined time;
  wherein the haptic feedback comprises the first haptic signal and second haptic signal;
  wherein the first haptic signal and second haptic signal constructively interfere at the location of user input.

18. The computer-program product of claim 17, the medium storing further instructions executable by a processor to:
  determine the waveform characteristics of the first haptic signal; and
  determine the waveform characteristics of the second haptic signal based on the waveform characteristics of the second haptic signal.

* * * * *